US006801830B1

(12) United States Patent
Tomita et al.

(10) Patent No.: US 6,801,830 B1
(45) Date of Patent: Oct. 5, 2004

(54) OPERATION CONFIRMING METHOD AND DEVICE FOR INDUSTRIAL MACHINERY

(75) Inventors: Koji Tomita, Kitakyushu (JP); Tatsumi Nakazato, Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 210 days.

(21) Appl. No.: 10/110,216

(22) PCT Filed: Oct. 16, 2000

(86) PCT No.: PCT/JP00/07178

§ 371 (c)(1),
(2), (4) Date: Apr. 19, 2002

(87) PCT Pub. No.: WO01/29629

PCT Pub. Date: Apr. 26, 2001

(30) Foreign Application Priority Data

Oct. 20, 1999 (JP) .......................................... 11/298859

(51) Int. Cl.$^7$ ............................................. G06F 19/00
(52) U.S. Cl. .......................... 700/189; 700/47; 700/88; 700/188; 700/252; 318/568.1; 318/568.13; 318/568.15; 318/568.18; 318/625; 703/2; 703/7; 901/5
(58) Field of Search .............................. 700/28–31, 23, 700/26, 47–50, 56, 61, 63, 64, 73, 74, 86–89, 186–191, 252, 253, 257; 318/560, 567, 568.1, 568.11–568.15, 565, 568.18, 625; 703/2, 6, 7; 901/3–5

(56) References Cited

U.S. PATENT DOCUMENTS

| 4,086,522 A | * | 4/1978 | Engelberger et al. .. 318/568.13 |
| 4,140,953 A | * | 2/1979 | Dunne ......................... 700/257 |
| 4,482,968 A | * | 11/1984 | Inaba et al. ............. 318/568.22 |
| 4,550,383 A | * | 10/1985 | Sugimoto .................... 700/262 |
| 4,617,502 A | * | 10/1986 | Sakaue et al. ......... 318/568.18 |
| 4,629,860 A | * | 12/1986 | Lindbom ................. 219/125.1 |
| 4,823,279 A | * | 4/1989 | Perzley et al. .............. 700/251 |
| 5,198,984 A | * | 3/1993 | Yamaguchi et al. ........ 700/188 |
| 5,304,905 A | * | 4/1994 | Iwasaki ...................... 318/561 |
| 6,463,358 B1 | * | 10/2002 | Watanabe et al. ........... 700/253 |

FOREIGN PATENT DOCUMENTS

JP   61090209 A  *  5/1986  ........... G05B/19/42

OTHER PUBLICATIONS

Heui–Wook Kim et al., "Accurate Position for AC Servo Motor using Novel Speed Estimator", Proceedings of the 1995 IEEE IECON 21st International Conference on Industrial Electronics, Control, and Instrumentation, vol. 1, Nov. 6–10, 1995, pp. 627.*
K. L. Yung et al., "Dual Control of Closed–loop Stepping Motor Precision Servo", Proceedings of the IEEE 1999 International Conference on Power Electronics and Drive Systems, PEDS '99, vol. 2, Jul. 27–29, 1999, pp. 803–808.*
Patent Abstracts of Japan, Publication No. 06–187028, dated Jul. 8, 1994. See PCT search report.
Patent Abstracts of Japan, Publication No. 05–053635, dated Mar. 5, 1993. See PCT search report.

* cited by examiner

*Primary Examiner*—Anthony Knight
*Assistant Examiner*—Crystal J Barnes
(74) *Attorney, Agent, or Firm*—Westerman, Hattori, Daniels & Adrian, LLP

(57) ABSTRACT

An operation confirming method capable of making, in order to enhance an operation program correction efficiency, an operation path at an operation confirming time (teaching mode) identical with that at an actual job time (play mode) as much as possible; and a control device therefor. The method comprises the steps of inputting respective shaft operation instruction values ($\omega j$) based on an actual operation speed to a mechanical simulator-carrying low-speed instruction converter (7), and instructing to a servo controller unit (4) a quantity ($\omega ij$) (=$\omega sj/P$), obtained by dividing an output ($\omega sj$) from the mechanical simulator by a specified positive real number P at the low-speed instruction converter, as respective shaft operation values N times (N; maximum natural number not exceeding the real number P).

14 Claims, 15 Drawing Sheets

(a)

(b)

(a)

(b)

"PRIOR ART"

"PRIOR ART"

Multiple-shaft industrial machinery

"PRIOR ART"

OPERATION CONFIRMING METHOD AND DEVICE FOR INDUSTRIAL MACHINERY

TECHNICAL FIELD

The present invention relates to an operation confirming method when checking an actual operation path of industrial machinery which is provided with a plurality of shafts driven by servo motors in compliance with operation programs, and a control device suited to embodiments of the above-described operation confirming method.

BACKGROUND ARTS

Generally, where a job (welding and cutting) is carried out by industrial machinery (for example, industrial robots, machining centers) having a plurality of shafts, operation programs are prepared in advance, and the industrial machinery is caused to execute operations as per instructions by reading operation instructions written in the programs.

FIG. 13 is a configurational view showing the construction of a control device for a prior art industrial machine. In the drawing, 1 denotes a control device for industrial machinery, and the control device 1 is composed of an operation instruction data storing portion 2, a shaft operation instruction preparing portion 3, and a servo controller unit 4. Also, 5 denotes a servo motor that drives an object industrial machine.

The operation instruction data storing portion 2 is a device that stores operation programs prepared in advance and reproduces the same. When executing the operation programs, instruction data are sequentially read from the operation instruction data storing portion 2 into the shaft operation instruction preparing portion 3. Instruction data are control points of an object industrial machine, that is, end-effecter attaching portions in the case of industrial robots, or a position and a speed at a point that is used as a tool attaching reference in the case of a machining center, wherein a position Pi (i=0 through N−1, N: Number of all actuating points) and a speed Vti (Operating speed of Pi through Pi+1) are sequentially read into the shaft operation instruction preparing portion 3.

In the shaft operation instruction preparing portion 3, the instruction data are converted to operation instructions (quantity of operation per unit time) ωj (j=1, , , M: M indicates the number of shafts) for servo motors 5 for respective shafts.

The operation is called "inverted conversion" for general industrial machinery, and is called "pulse distribution" in an NC (Numerical Control) apparatus used for a machining center, etc. Respective shaft operation instructions ωj that are prepared herein are transmitted to the servo controller unit 4, and the servo controller unit 4 controls a servo motor 5 so that respective shafts of the servo motor 5 operate as per instructions ωj.

In industrial machinery having such a construction as described above, before executing an actual job (welding, cutting, etc.), it is necessary to check whether or not the operation programs are prepared as intended. That is, it is checked whether or not control points of the industrial machinery operate while drawing an intended path. At this time, if any part of the program is inadequate when the industrial machinery is actuated at a speed that is designated by the operation program (hereinafter, an actual operation instruction speed), not only may an actual workpiece and/or fixture be damaged, but also an operator may be subjected to danger. Therefore, it is general that the industrial machinery is not operated at an actual operation speed, but is operated at lower speed than the actual operation speed.

In order for the industrial machinery to be operated at a lower speed, as shown in FIG. 14, the actual operation instruction speed Vti that is read from the operation instruction data storing portion 2 is passed through a low speed instruction converting portion 6 before transmitting the same to the shaft operation instruction preparing portion 3. In the low speed instruction converting portion 6, the instruction speed is decreased to a ratio $\alpha(0<\alpha<1)$ that is designated in advance. That is, Via=Vti*α is transmitted to the shaft operation instruction preparing portion 3 as a new instruction speed.

However, the following problems exist where an operation check is carried out in this type of prior art control device. FIG. 15 is a view showing a comparison of operation paths to describe the problems in an operation confirming method for industrial machinery, which is embodied by a prior art control device. In the drawing, P0 is an initial position of the control point of industrial machinery. When an operation program is prepared, which brings about an inverted L-shaped channel in which the control point advances from Point P0 to Point P1 at a constant speed, and next advances from Point P1 to Point P2 at a constant speed, the operation path in an actual job not bypassing the low speed instruction converting portion greatly depicts an inward curve, skipping Point P1 as shown by C0. This phenomenon is called an "inward short-cut" resulting from a so-called servo delay. The faster the speed becomes, the larger the curve becomes. On the other hand, if the speed is made lower, bypassing the low speed instruction converting portion, the operation path depicts a small curve outside the operation path C0 as shown by C1. That is, there is a problem in that, when confirming operations at a low speed, the operation path cannot reproduce the actual operation path at an actual operation speed.

DISCLOSURE OF THE INVENTION

Therefore, it is an object of the present invention to provide an operation confirming method capable of making, in order to enhance an operation program correction efficiency, an operation path at an operation confirming time (teaching mode) as identical as possible to that of an actual job time (play mode); and a control device therefor.

In order to solve the above-described and other problems, an operation confirming method for industrial machinery, by which the operation path is confirmed by actuating industrial machinery provided with a plurality of shafts driven by a servo motor controlled by a servo controller unit at a lower speed than an actual operation speed, according to the first aspect of the invention, comprises the steps of inputting respective shaft operation instruction values ωj based on the above-described actual operation speed into a simulator, which reproduces a servo control loop at an actual operation speed in the above-described industrial machinery, and instructing a quantity ωsj/P, which is obtained by dividing an output ωsj from the above-described simulator by an appointed positive real number P to the above-described servo controller unit N times (however, N is the maximum natural number not exceeding the above-described real number P) as respective shaft operation instruction values.

Also, an operation confirming method according to the second aspect of the invention comprises the steps of inputting a quantity ωj/P, which is obtained by dividing respective shaft operation instruction values ωj based on the above-described actual operation speed by an appointed positive real number P, into a simulator, which reproduces a servo control loop at an actual operation speed of the above-described industrial machinery, N times (however, N is the maximum natural number not exceeding the above-described real number P), and instructing an output ωsij from the above-described simulator into the above-described servo controller unit as respective shaft operation instruction values.

In the operation confirming method according to the third aspect of the invention, where the above-described actual operation speed is smaller than an appointed value, a value of the above-described real number P is determined to be 1.0.

In addition, in the operation confirming method according to the fourth aspect of the invention, where respective shaft instruction values ωsj from the above-described simulator are smaller than values determined shaft by shaft in advance, a value of the above-described real number P is determined to be 1.0.

In the operation confirming method according to the fifth aspect of the invention, where the above-described respective shaft operation instruction values ωj are smaller than values determined in advance shaft by shaft, the value of the above-described real number P is determined to be 1.0.

An operation confirming method according to the sixth aspect of the invention comprises the steps of storing operation paths of the above-described industrial machinery by actuating the industrial machinery at an actual operation speed, that is, positions of the above-described industrial machinery, which are sampled at respective appointed sampling times, as a row of points consisting of n+1 (however, n is a natural number); converting the above-described operation paths to a row of points consisting of N·(n+1) by interpolating a zone between respective adjacent points of the above-described row of points by dividing the zone by a natural number N set in advance; and sequentially instructing position instructions of respective shafts corresponding to the above-described row of points of N·(n+1) to the above-described servo controller unit.

In the operation confirming method according to the seventh aspect of the invention, a status inference observer is connected to a servo controller unit of the above-described industrial machinery, and an operation path is inferred by the above-described status inference observer by actually actuating the above-described industrial machinery at an actual operation speed.

The operation confirming method according to the eighth aspect of the invention further comprises the steps of inputting a current instruction value that is applied to the above-described servo motor; connecting a mechanical simulator, which requests operations of the above-described industrial machinery, to the servo controller unit of the above-described industrial machinery; and preparing an operation path for the above-described industrial machinery to operate at an actual operation speed by the above-described mechanical simulator.

The operation confirming method according to the ninth aspect of the invention further comprises the steps of inputting a rotation angle instruction of a shaft, which is driven by the above-described servo motor, into the servo controller unit of the above-described industrial machinery; connecting a servo mechanical simulator, which requests an operation of the above-described industrial machinery; and preparing an operation path for the above-described industrial machinery to operate at an actual operation speed by the above-described servo mechanical simulator.

Further, a control device for industrial machinery, according to the tenth aspect of the invention, including an operation instruction data storing portion that stores and reproduces operation programs for industrial machinery provided with a plurality of shafts driven by servo motors; a shaft operation instruction preparing portion that prepares operation instructions of respective shafts of the above-described plurality of shafts upon receiving instructions of the above-described operation instruction data storing portion; and a servo controller unit that provides a drive current to the above-described servo motors upon receiving respective shaft operation instructions of the above-described shaft operation instruction preparing portion; wherein the same control device further comprises, between the above-described shaft operation instruction preparing portion and the servo controller unit, a simulator that reproduces a servo control loop at an actual operation speed of the above-described industrial machinery upon receiving the above-described respective shaft operation instructions; and a low speed instruction converting portion that divides an output ωsj of the above-described simulator by an appointed positive real number P and instructs the same to the servo controller unit N times (however, N is the maximum natural number not exceeding the above-described real number P).

The control device according to the eleventh aspect of the invention further comprises, between the above-described shaft operation instruction preparing portion and the servo controller unit, a low speed instruction converting portion that outputs a value, which is obtained by dividing the above-described respective shaft operation instructions by an appointed positive real number P, N times (however, N is the maximum natural number not exceeding the above-described real number P), and a simulator that reproduces a servo control loop at an actual operation speed of the above-described industrial machinery upon receiving an output of the above-described low speed instruction converting portion.

The control device according to the twelfth aspect of the invention further comprises: a status inference observer that is connected to the above-described servo controller unit and infers positions of the above-described industrial machinery; an operation result storing portion that stores the positions of the above-described industrial machinery, which are inferred by the above-described status inference observer, at a fixed cycle, and stores the operation path of the above-described industrial machinery as a row of points consisting of n+1; and a low speed instruction converting portion that converts the above-described operation path to a row of points of N·(n+1) by interpolating a zone between adjacent points of the above-described row of points stored by the above-described operation result storing portion by dividing the zone by a natural number N set in advance and sequentially instructs position instructions of the respective shafts corresponding to the above-described row of points of N·(n+1) to the above-described servo controller unit.

The control device according to the thirteenth aspect of the invention further comprises: a mechanical simulator that is connected to the above-described servo controller unit and requests an operation of the above-described industrial machinery by inputting a current instruction value applied to the above-described servo motor; an operation result storing portion that stores positions of the above-described industrial machinery, which are inferred by the above-described mechanical simulator, at a fixed cycle, and stores an operation path of the above-described industrial machinery as a row of points of n+1; and a low speed instruction converting portion that converts the above-described operation path to a row of points of N·(n+1) by interpolating a zone between adjacent points of the above-described row of points stored by the above-described operation result storing portion by dividing the zone by a natural number N set in advance and sequentially instructs position instructions of the respective shafts corresponding to the above-described row of points of N·(n+1) to the above-described servo controller unit.

The control device according to the fourteenth aspect of the invention further comprises: a servo mechanical simulator that requests an operation of the above-described industrial machinery by inputting a rotation angle instruction of a shaft driven by the above-described servo motor; an operation result storing portion that stores positions of the above-described industrial machinery, which are inferred by the above-described servo mechanical simulator, at a fixed cycle, and stores an operation path of the above-described industrial machinery as a row of points of n+1; and a low speed instruction converting portion that converts the above-described operation path to a row of points of N·(n+1) by interpolating a zone between adjacent points of the above-described row of points stored by the above-described operation result storing portion by dividing the zone by a natural number N set in advance and sequentially instructs position instructions of the respective shafts corresponding to the above-described row of points of N·(n+1) to the above-described servo controller unit.

BEST MODE FOR CARRYING OUT THE INVENTION

Hereinafter, a description is given of embodiments of the invention on the basis of the accompanying drawings. Also, components which are common to those in the prior art examples are given the same reference numbers, and overlapping description thereof is omitted.

Figure 1:
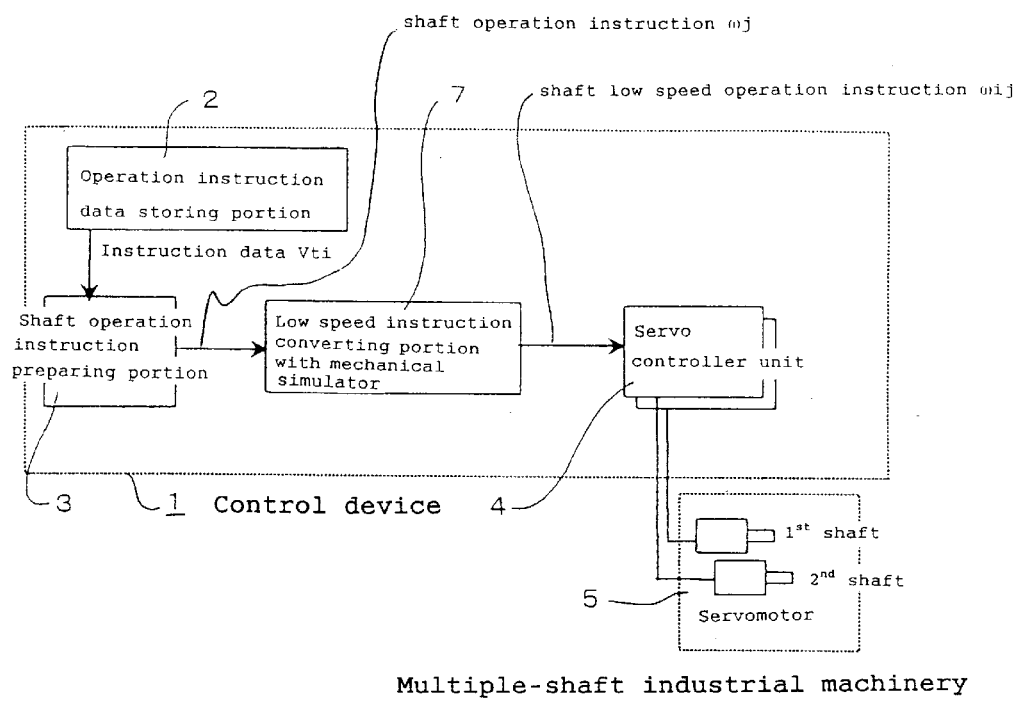
FIG. 1 is a configurational view of a control device showing a first embodiment of the invention.

FIG. 1 is a configurational view of a control device showing the first embodiment of the invention. In the drawing, 7 denotes a low speed instruction converting portion including a mechanical simulator, and is inserted between a shaft operation instruction preparing portion 3 and a servo controller unit 4.

Figure 2:
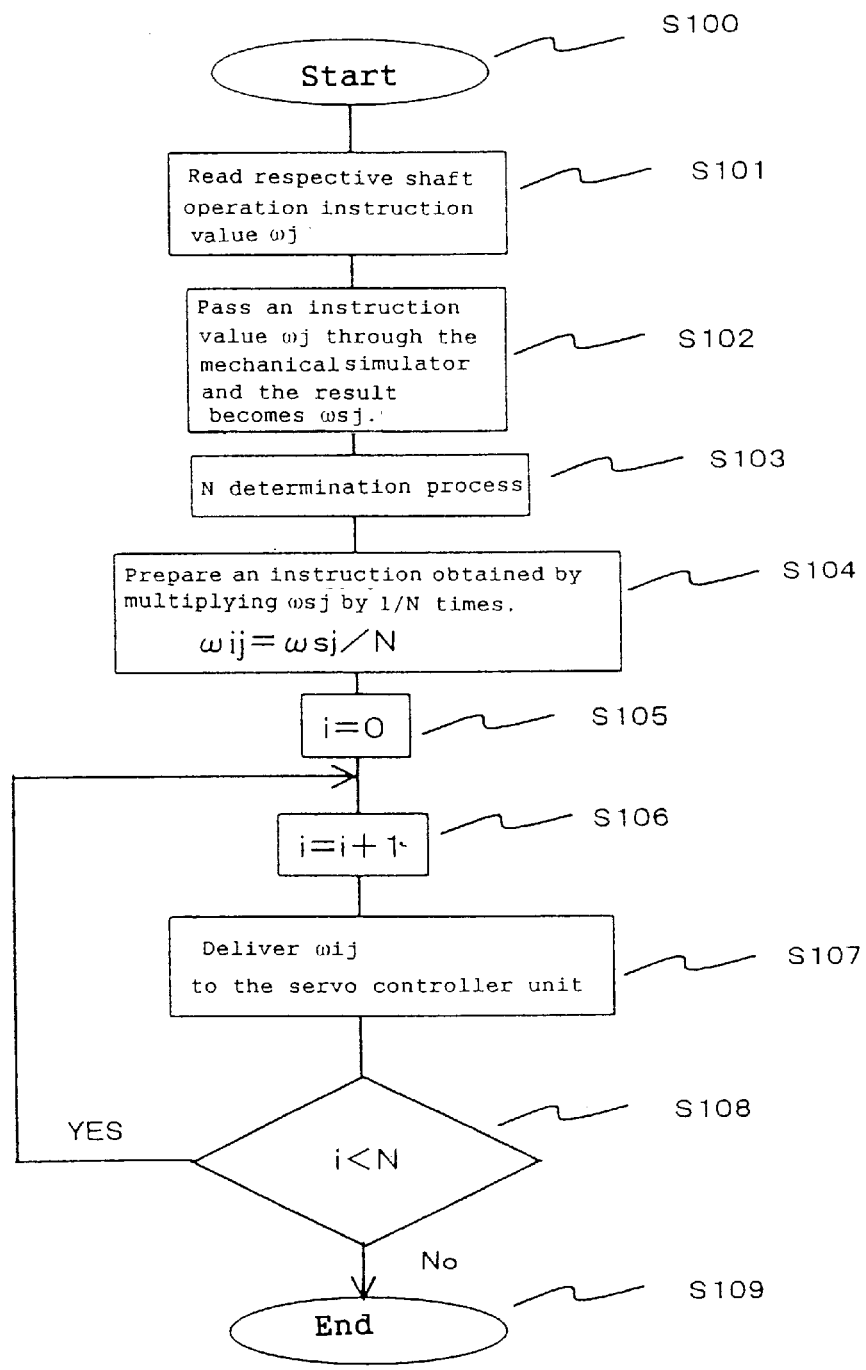
FIG. 2 is a flow chart showing the first embodiment of the invention.

Herein, a description is given of operations of the low speed instruction converting portion 7 with a mechanical simulator with reference to FIG. 2.

In FIG. 2, when an instruction is issued from the shaft operation instruction preparing portion 3, the process shifts to Step S100, wherein the low speed instruction converting portion 7 with a mechanical simulator commences its operation.

In S101, respective shaft operation instruction values $\omega j$, which are prepared by the shaft operation instruction preparing portion, are read.

Figure 3:
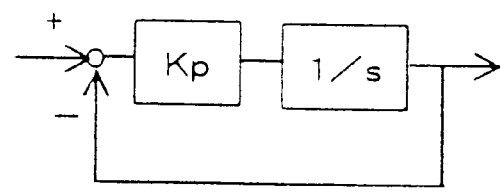
FIG. 3 is a configurational view of a mechanical simulator showing the first embodiment of the invention.
Figure 4:
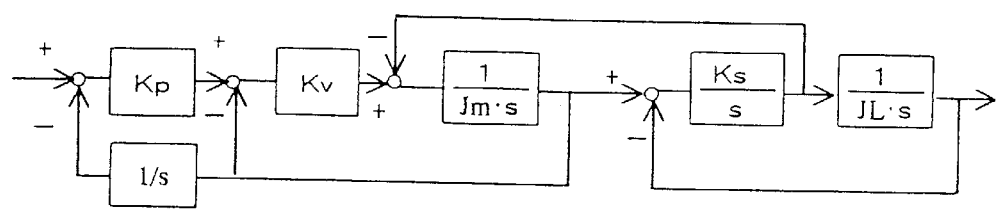
FIG. 4 is another configurational view of a mechanical simulator showing the first embodiment of the invention.

S102 is a step corresponding to a mechanical simulator of the low speed instruction converting portion 7 with a mechanical simulator, and functions to simulate operations of a servo controller unit and industrial machinery with multiple shafts. There are various types in this construction. For example, the simplest example is a primary delay filter as shown in FIG. 3. Herein, Kp is a position loop gain. Also, in a type having a controller for position P control and speed P control in a 2-inertia spring system, such a construction as shown in FIG. 4 may be employed. In FIG. 4, Kv indicates a speed loop gain, Jm indicates a motor inertia, JL indicates a load inertia, and Ks indicates a spring constant. In addition thereto, where the object is a mechanism such: as a vertical type multiple-joint robot, a multiple-shaft model in which interference of respective shafts is taken into consideration, maybe utilized. An output of the mechanical simulator is made into $\omega sj$.

In S103, the N number of divisions, which is used in subsequent steps, is determined. There are various methods for determining the N number of divisions. However, the first method for determining the same is such that an actual operation instruction speed Vi is compared with a speed Vc determined in advance, and N=1 is employed if the former is smaller than the latter, because there is no need to make the speed any lower if the actual operation instruction speed is smaller. If Vi is larger than Vc, the value of N is made larger than 1.

Also, another method for determining the N number of divisions is such that respective shaft instructions $\omega sj$ are compared with speeds $\omega jc$ which are determined in advance shaft by shaft, N=1 is employed if $\omega sj$ is smaller than $\omega jc$ for all shafts, while the value N is made larger than 1 if $\omega sj$ is larger than $\omega jc$ in any one of the shafts.

S104 is a step corresponding to the lower speed instruction converting portion of the lower speed instruction converting portion 7 with a mechanical simulator. $\omega sj$ is divided by N, which is designated in S103, wherein respective shaft low speed operation instructions are prepared with $\omega ij = \omega sj/N$.

In S105, the system is initialized on the basis of i=0.

In S106, i is incremented.

In S107, $\omega ij$ prepared in S104 is delivered to the servo controller unit. The delivered $\omega ij$ is interpreted to be a normal instruction, and is used in the servo controller unit.

In S108, i is compared with N, and the same $\omega ij$ is continuously delivered until the i reaches N. When the i reaches N, the process is terminated in S109. If an instruction is issued again from the shaft operation instruction preparing portion, the process shifts to Step S100, and reading of respective shaft operation instruction values ωj is commenced. If no instruction is issued, the system stands by until a new instruction is issued.

Figure 5:
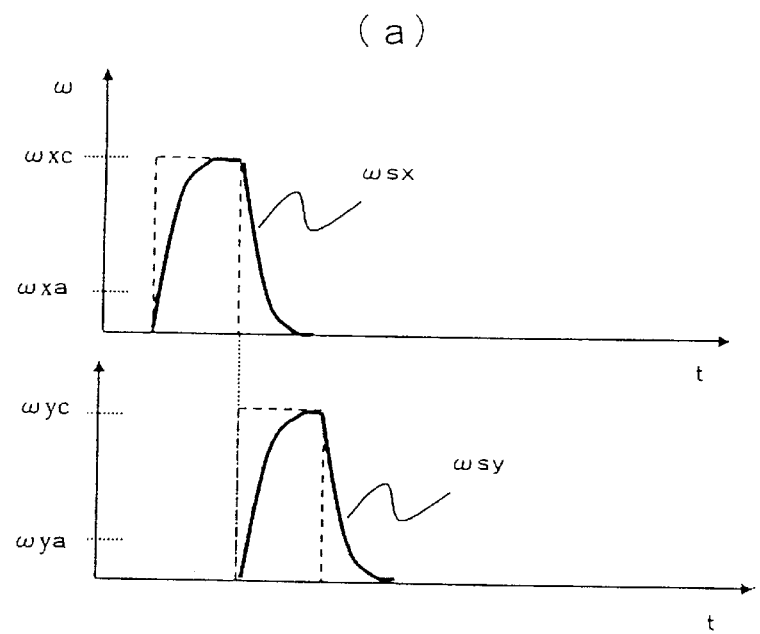
FIGS. 5 are time charts showing the first embodiment of the invention, wherein (a) shows an actual operation speed instruction, and (b) shows an operation speed instruction after being converted to a low speed instruction.
Figure 5:
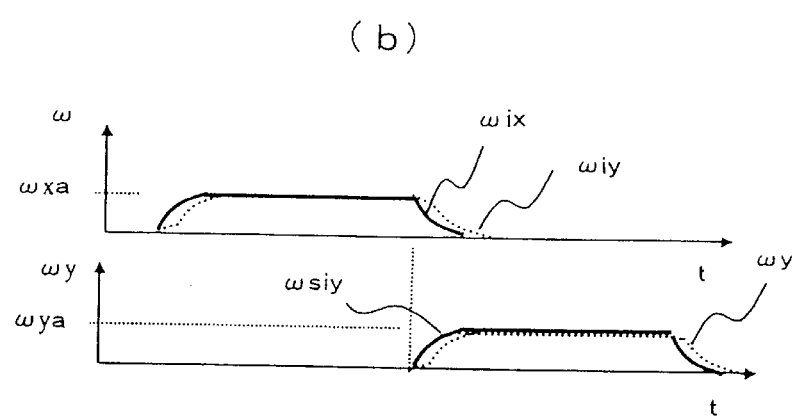

Results of the above-described process are shown in FIGS. 5. FIG. 5(a) is a time chart showing an actual operation speed instruction, and FIG. 5(b) is a time chart showing an operation instruction speed after being converted to a low speed instruction. The low speed operation instruction ωij (j=x,y) is outputted to the servo controller unit 4 to actuate the industrial machinery. The operation result is ωj (j=x,y). As shown in FIG. 5(b), a slip amount between the low speed operation instruction ωij and the operation result ωj is small. Because, in the present invention, the speed ωij is low, and the slip amount of the path is proportionate to (ωij/Kp)^2 in the primary proximity as has been well known. Also, even in a case where the machine is provided with a resilient element, almost no vibration is generated at a low speed, wherein an operation brought about in the mechanical simulator can be achieved.

Figure 6:
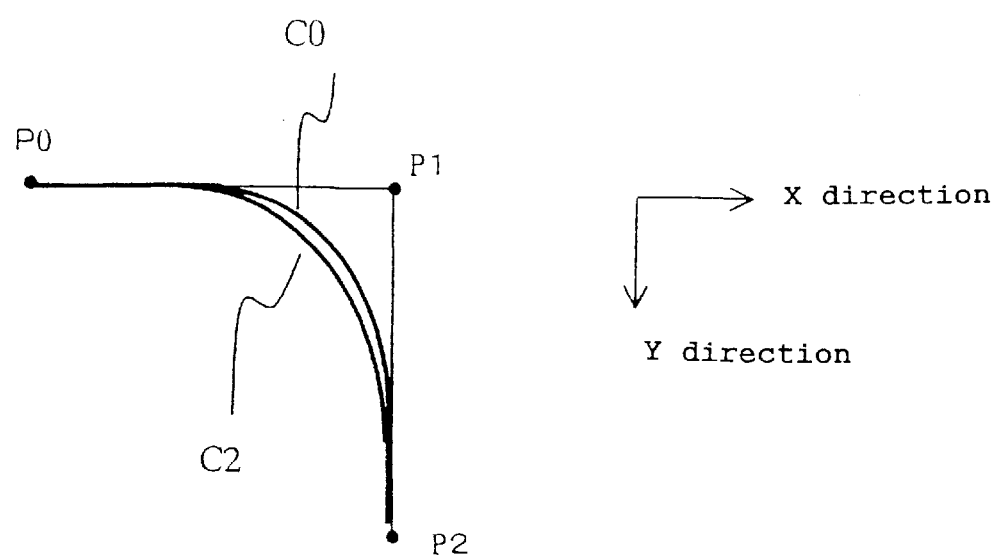
FIG. 6 is a comparison view of an operation path showing the first embodiment of the invention.

FIG. 6 shows comparisons between the operation path C2 according to the embodiment and the operation path C0 at an actual operation speed. The operation path C2 is thus almost coincident with the operation path C0.

Figure 7:
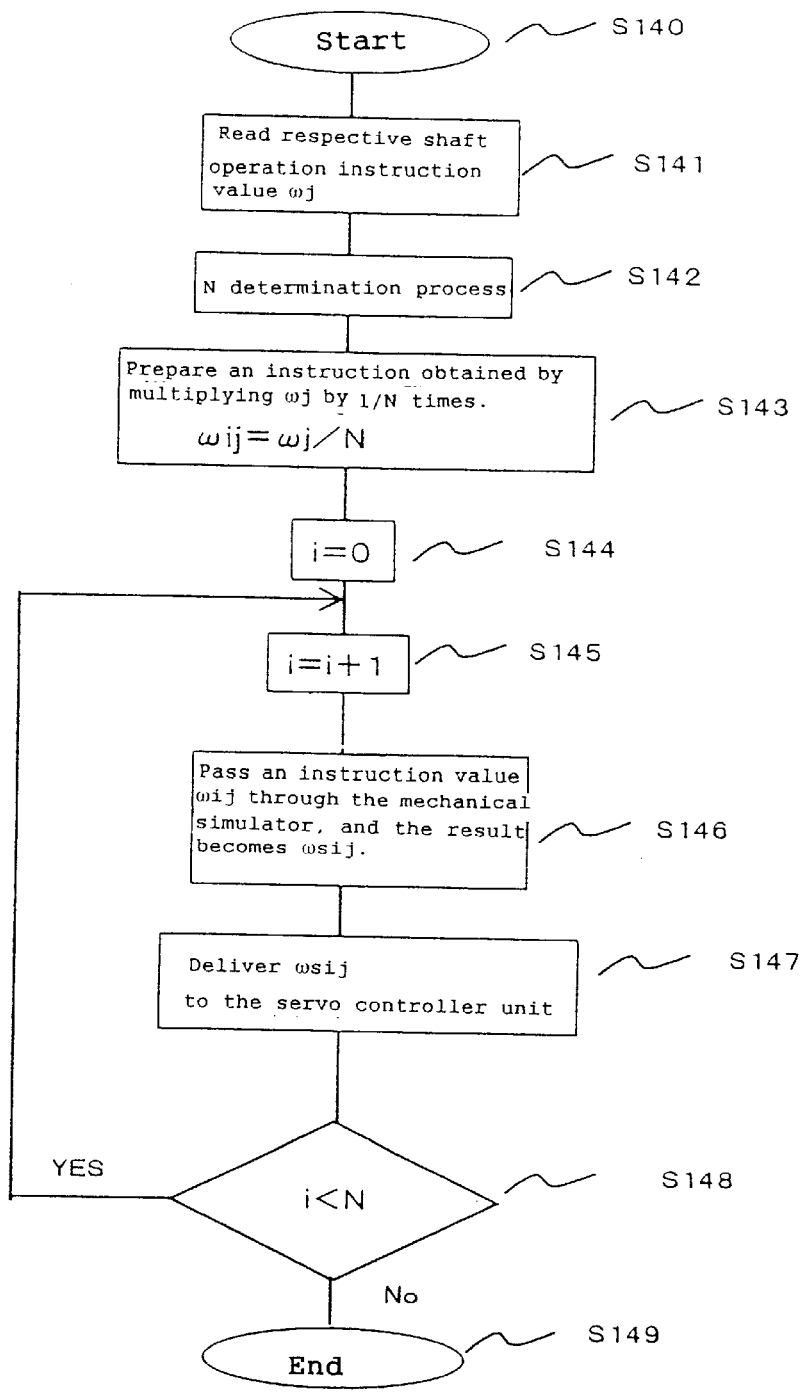
FIG. 7 is a flow chart showing a second embodiment of the invention.

A description is given of operations of the low speed instruction converting portion 7 with a mechanical simulator shown in a second embodiment with reference to FIG. 7.

In FIG. 7, if an instruction is issued from the shaft operation instruction preparing portion 3, the process advances to Step S140, wherein the low speed instruction converting portion 7 with a mechanical simulator commences its operation.

S141 and S142 are the same as S101 and S103 in the first embodiment.

In S143, ωj that is read in S141 is divided by N that is designated in S142, and respective shaft low speed operation instructions are prepared on the basis of ωij=ωj/N.

S144 and S145 are, respectively, the same as S105 and S106 in the first embodiment.

In S146, the instruction value ωij divided in S143 is passed through the mechanical simulator. The result is made into ωij.

In S147, ωsij is delivered to the servo controller unit as in S107.

S148 and S149 are, respectively, the same as S108 and S109 in the first embodiment.

By the method according to the second embodiment, it is possible to reach the operation path at a low speed operation with the operation path at an actual operation speed as in the first embodiment.

Also, the low speed instruction converting portion 7 with a mechanical simulator shown in FIG. 2 and FIG. 7 is generally prepared in terms of software, which is executed by a CPU in the control device 1. Further, in the first and second embodiments, a description was given of the case where N is a natural number. However, it is needless to say that the N can be easily extended if such a process by which the surplus thereof is stored and is utilized for the next instruction is employed in the case where the N is not a natural number but a positive real number.

Figure 8:
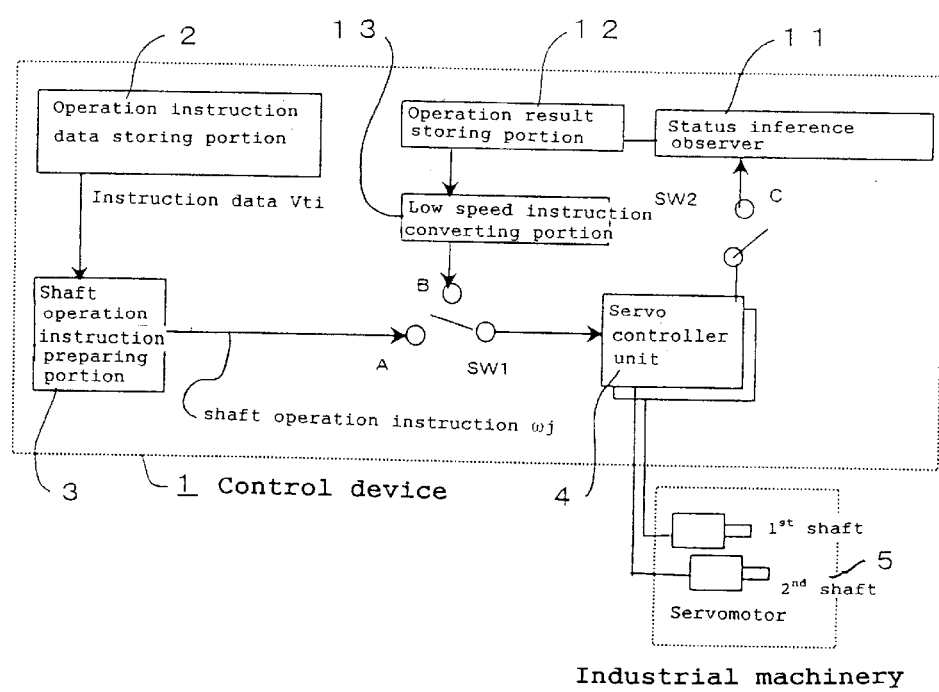
FIG. 8 is a configurational view of a control device showing a third embodiment of the invention.

Next, a description is given of a third embodiment of the invention. FIG. 8 is a configurational view of a control device, which shows the third embodiment. In the drawing, 11 denotes a status inference observer. 12 denotes an operation result storing portion, and 13 denotes a low speed instruction converting portion. A description is given of the functions of the control device 1 with reference to FIG. 8.

Figure 9:
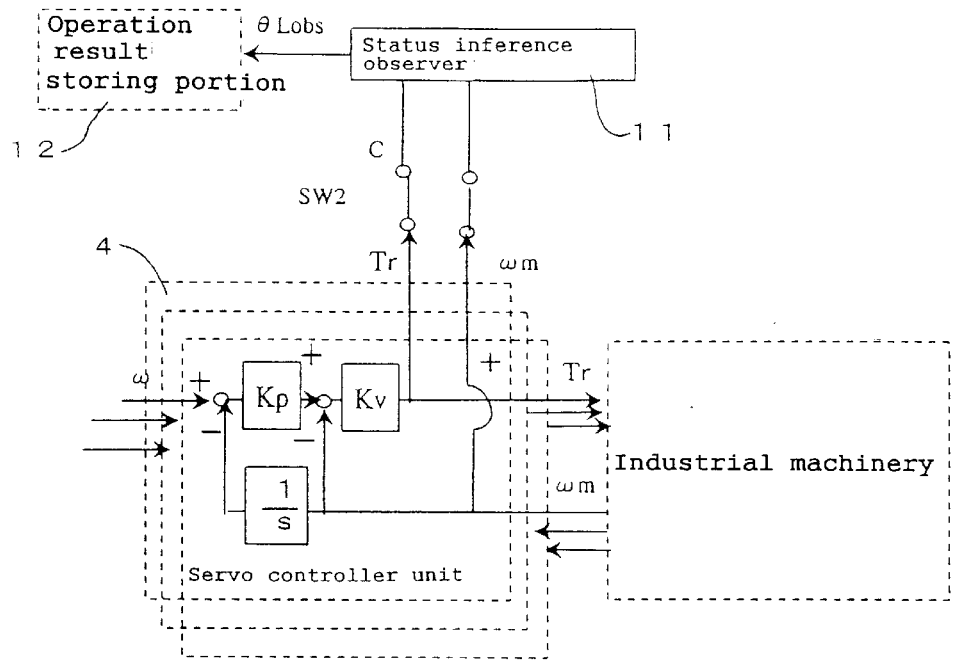
FIGS. 9 are diagrams of status inference observers showing the third embodiment of the invention, wherein (a) shows a diagram of connection with peripheral equipment, and (b) is a block diagram of internal control.
Figure 9:
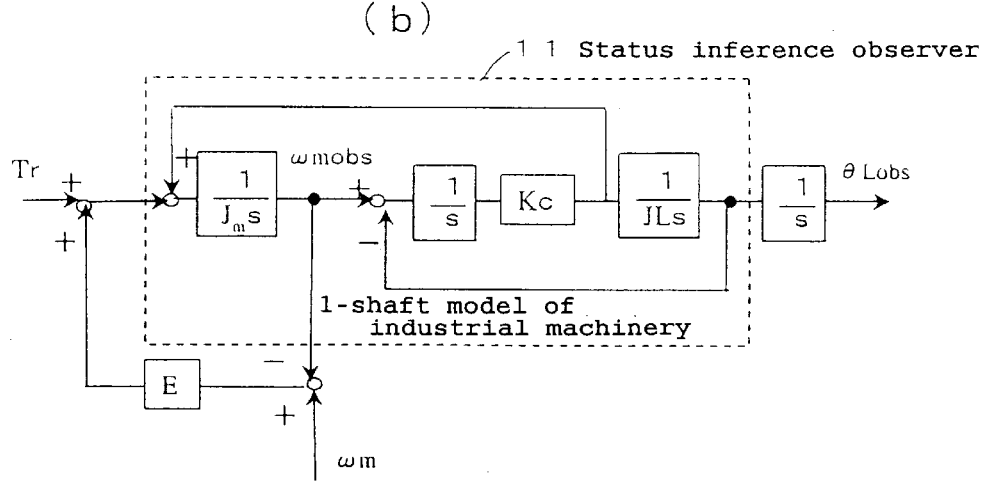

First, a changeover switch SW1 is set to A, and changeover switch SW2 is set to C, wherein the machinery is operated at an actual operation speed by reading instruction data from the operation instruction data storing portion 2 (hereinafter, this is called an "operation storing mode"). At this time, the operation is a normal operation, and the actuator (for example, a motor) and machinery are operated at an actual operation speed. At this time, the servo controller unit 4 is generally based on semi-closed control. That is, signals of the motor are fed back, and the tip end position θL, which carries out an actual job, is not observed. Accordingly, herein, θL is inferred by a status inference observer 11 that has been well known. The status inference observer 11 is subjected to various shapes, an explanation of which is described in, for example, [Design Theory of Linear Control System] authored by Itoh, Kimura, and Hosoe. Here, a method in which an all-dimensional observer having a block linear diagram shown in FIGS. 9 is illustrated. Herein, 1 shaft of a machine is modeled to be a 2-inertia system, JL indicates a model machine load inertia, Jm indicates the primary side inertia, Kc indicates a spring constant, and E indicates a parameter that is adequately selected to determine an eigen value of the observer.

Where the status inference observed having such a construction as shown above is used, θLobs is obtained as an inference value of a position θL.

The position θLobs at the mechanical side, which is observed by the observer is stored once every sampling time Ts, which is determined in advance by the operation result storing portion 2 composed of a memory device such as a RAM, hard-disk, floppy disk, etc. Positions stored at this time are determined to be P0, P1, P2, ... Pi, , , , PN (The operation time is N·Ts), where Pk=Pk(θk1, θk2, θk3, , , , θkM) (M is the number of shafts of machinery), which means a position converted in terms of the motor shaft). Or the positions may be stored as V0, V1, V2, , , , Vi, , , , VN (The operation time is N·Ts) which are increments of the positions. (However, VK=Vk(ωk1, ωk2, ωk3, , , , ωkM (M is the number of shafts of machinery))).

The operation storing mode is terminated here.

Next, a description is given of an operation confirming mode.

Here, in order to check the actually moved path at a low speed, data that are stored in the operation storing mode are regarded as respective motor positions, and the speed is slowed down, and the data are delivered to the servo system.

First, the changeover switch SW1 is set to B, and the changeover switch SW2 is set to OPEN (OFF). And, positions that are stored in the operation result storing portion 12 are sequentially delivered to the low speed instruction converting portion 13.

Figure 10:
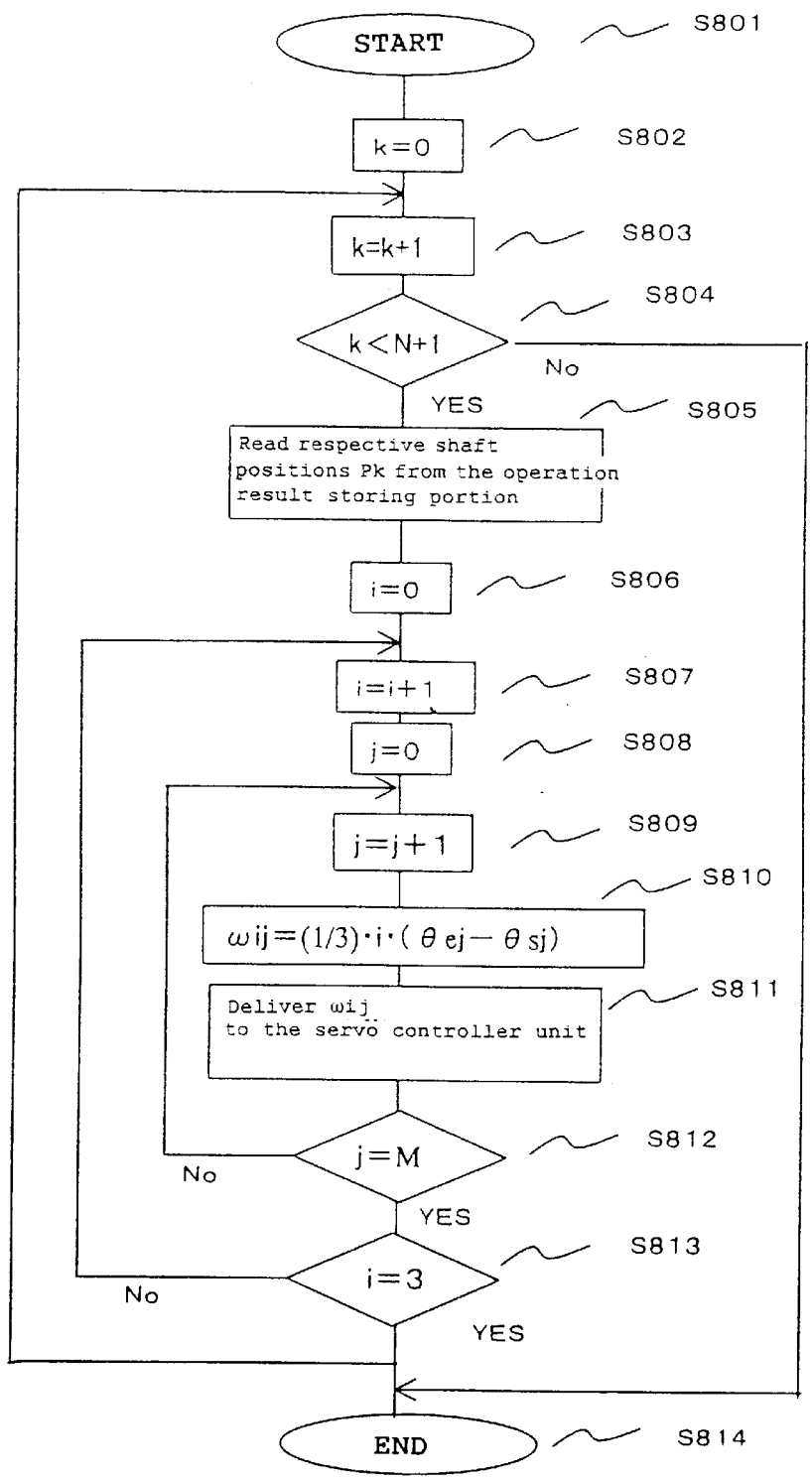
FIG. 10 is a flow chart showing the third embodiment of the invention.

With an idea similar to that in the method shown in the prior art, the speed is decreased to a ratio α(0<α<1) designated in advance in the low speed instruction converting portion 12. Here, on the basis of a flow chart shown in FIG. 10, a description is given, as an example, of operations of the low speed instruction converting portion 12 in a case where α=⅓ is established, and the sampling time Ts in the operation storing mode is the same as a cycle Tseg for delivering to the servo controller unit, that is, in a case where a zone between adjacent points in a row of points of N+1, which are obtained in the operation storing mode, is divided into three sections, and the points in the zone are interpolated. Also, any optional natural number may be selected as the number of divisions in respect to the zone between the above-described adjacent points. That is, values such as ½, ⅓, ¼, ⅕, etc., may be selected as the above-described ratio α.

In the drawing, S801 indicates commencement of the low speed instruction converting portion. The process is commenced when the mode in the control device becomes the operation confirming mode.

In S802, the system is initialized to be k=0.

In S803, 1 is added to k.

In S804, k is compared with N+1, wherein if k is smaller than N+1, it is judged that the final point of the stored point has not been reached, and the process shifts to S805. If not, it is judged that the final point has already been reached, and the process shifts to S814. That is, the process is terminated.

In S805, Pk that is stored in the operation storing portion is read.

In S806, the system is initialized to be i=0.

In S807, 1 is added to i.

In S808, the system is initialized to be j=0.

In S809, 1 is added to j.

In S810, value $\theta ij$ of a position instruction which is delivered at this time of delivery is calculated, where since $\alpha=\frac{1}{3}$ is established, the $\theta ij$ is given by Expression (1).

$$\theta ij=(\tfrac{1}{3})\cdot i \cdot (\theta ej-\theta sj)+\theta sj \qquad \text{Expression (1)}$$

Here, $\theta sj=\theta kj$ and $\theta ej=\theta k+1j$ are established.

In S811, the position instruction $\theta ij$ is delivered to the servo controller unit 4. Or the instruction is not the position instruction, but a position increment value $\omega ij$ of a unit time Tseg is delivered in the form of Expression (2).

$$\omega ij=(\tfrac{1}{3})\cdot i \cdot (\theta ej-\theta sj) \qquad \text{Expression (2)}$$

Or, if the operation storing portion stores a position instruction in terms of a position increment, the following Expression (3) may be used as it is.

$$\omega ij=(\tfrac{1}{3})\cdot 1 \cdot \omega kj \qquad \text{Expression (3)}$$

Which one of Expressions (1) through (3) is used is determined based upon the specifications of the servo controller unit. This does not influence the present invention. In the following description, it is assumed that Expression (2) is used.

Also, the delivery is managed by a timer so that it is carried out once every fixed time Tseg. This is the same as in the prior arts.

In S812, j is compared with the M number of shafts. Where j does not reach M, the process returns to S809. Where j reaches M and a position instruction is delivered to the servo controller unit corresponding to all shafts, the process shifts to S813.

In S813, i is compared with 3. The process returns to S807 unless i reaches 3. When i becomes 3, the process returns to S803, wherein the point stored in the operation storing portion is read. Since $\alpha=\frac{1}{3}$ is established, $\theta ij=\theta ej$ is established three times. This 3 changes according to α.

Next, a description is given of a fourth embodiment of the invention.

Figure 11:
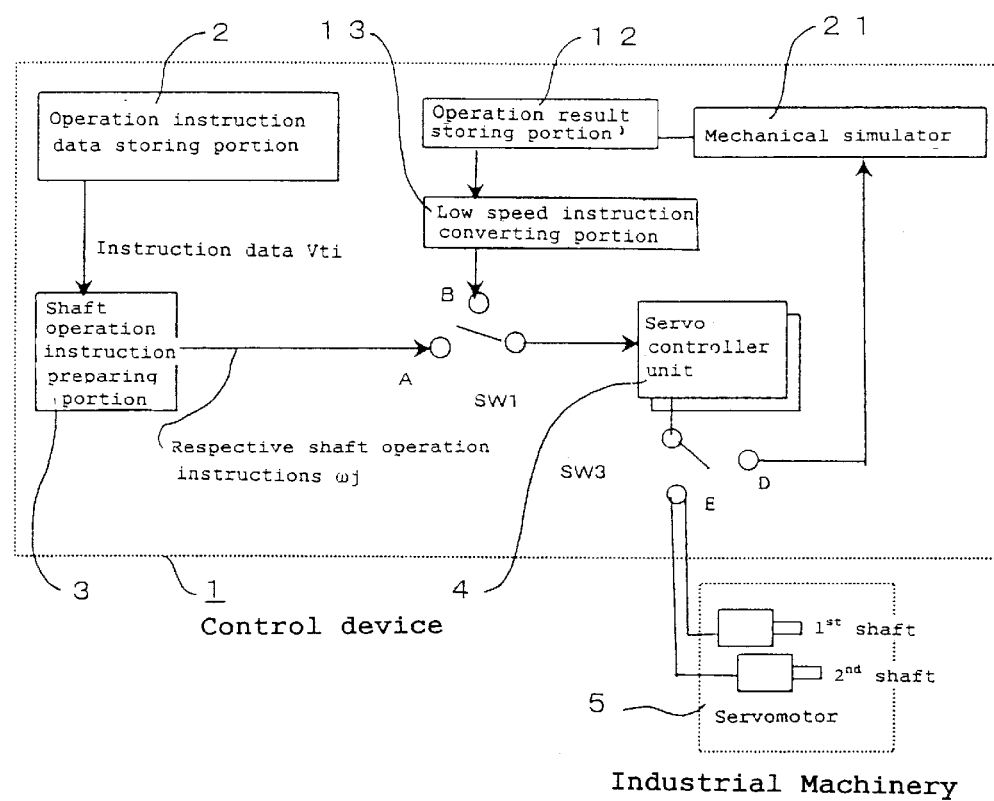
FIG. 11 is a configurational view of a control device showing a fourth embodiment of the invention.

FIG. 11 is a configurational view of a control device, which shows the embodiment. In the drawing, 21 denotes a mechanical simulator. The mechanical simulator 21 outputs an operation path of the industrial machinery by inputting a current instruction value applied to the servomotor.

In the operation storing mode, the changeover switch SW1 is set to A, and the changeover switch SW3 is set to D, wherein shafts are actuated at an actual job speed by reading instruction data from the operation instruction data storing portion 2. At this time, although the servo controller unit 4 carries out a normal operation, the servomotor 5 does not operate. Instead, the mechanical simulator 21 operates. The mechanical simulator 21 simulates an operation from motor current flow to mechanical operations. An operation path of the industrial machinery, which is obtained as the result is stored once every sampling time Ts, which is determined in advance. This completes the operation storing mode.

In the operation confirming mode, the changeover switch SW1 is set to B, and the changeover switch SW3 is set E. And, the method for sequentially delivering the positions stored in the operation result storing portion 12 to the low speed instruction converting portion 13 is completely the same as the method in the third embodiment. If so, since no actual machine operation is required in the operation storing mode, a safer operation check is enabled.

Next, a description is given of a fifth embodiment of the present invention.

Figure 12:
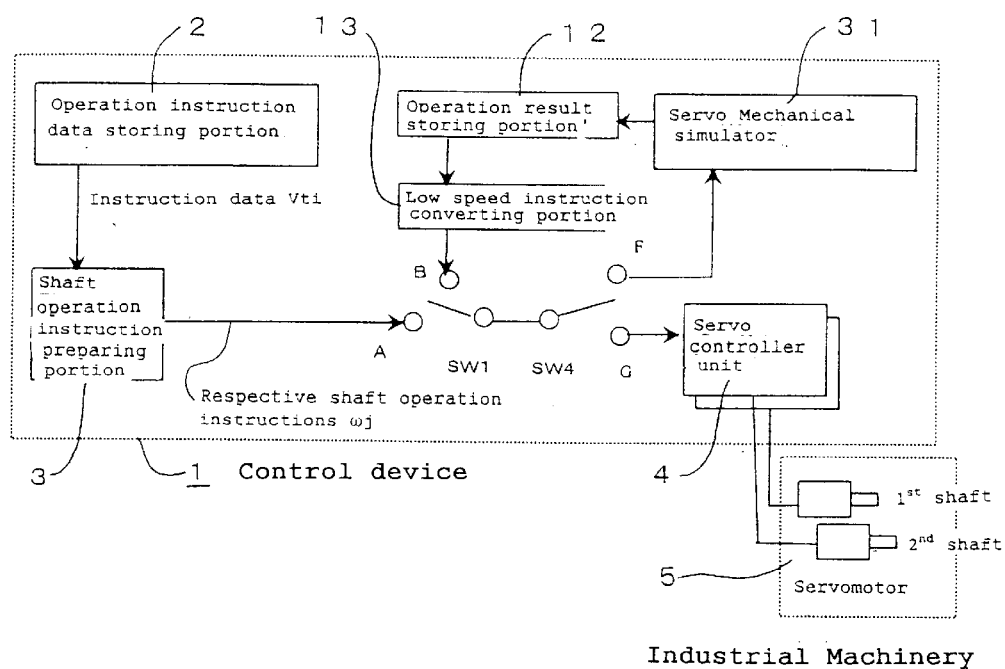
FIG. 12 is a configurational view of a control device showing a fifth embodiment of the invention.
Figure 13:
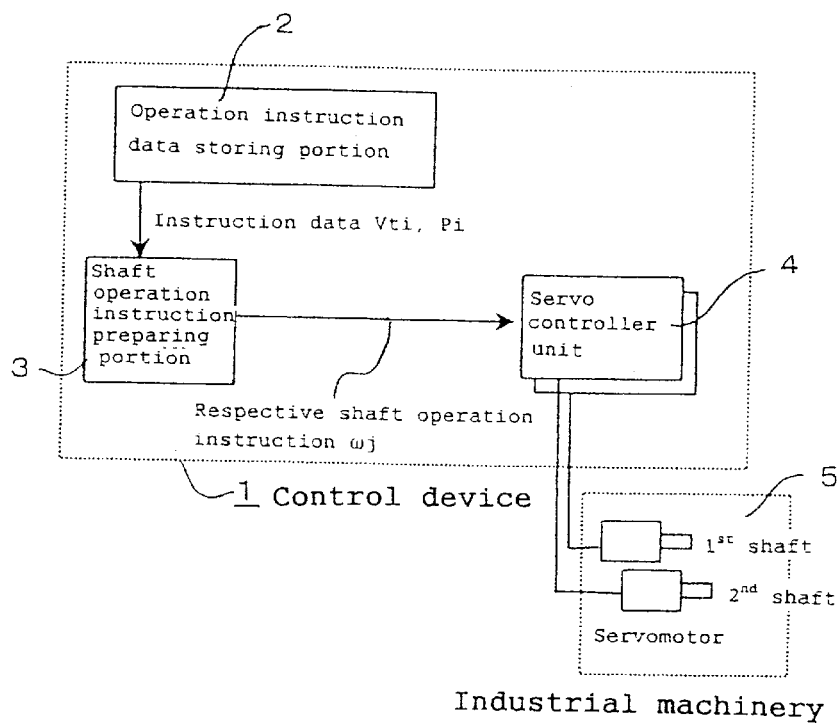
FIG. 13 is a configurational view of a control device showing a prior art example.
Figure 14:
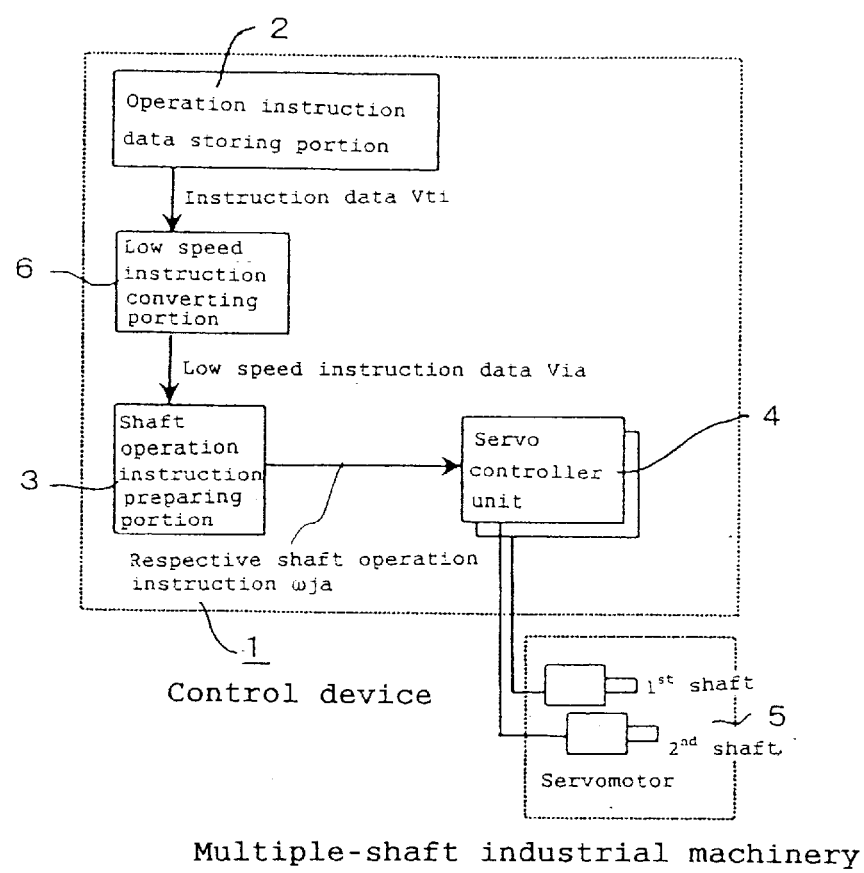
FIG. 14 is a configurational view of a control device showing another prior art example.
Figure 15:
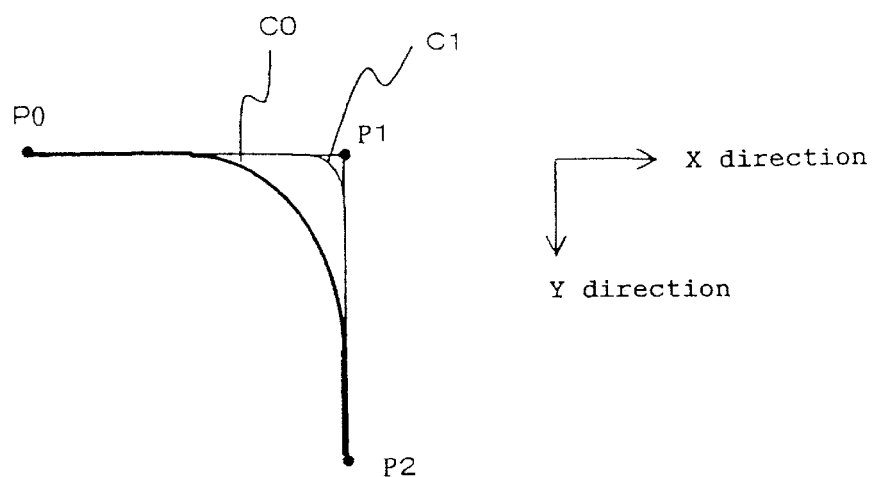
FIG. 15 is a comparison chart of operation paths showing the prior art example.

FIG. 12 is a configurational view of a control device, which shows the fifth embodiment. In the drawing, 31 denotes a servo/mechanical simulator. The servo/mechanical simulator 31 outputs an operation path of industrial machinery by inputting a rotation angle instruction of a shaft that is driven by a servomotor of the industrial machinery.

In the operation storing mode, the changeover switch SW1 is set to A, and the changeover switch SW4 is set to F. A shaft is actuated at an actual job speed by reading instruction data from the operation instruction data storing portion 2. However, the servo controller unit 4 and servomotor 5 do not operate. Instead, the servo/mechanical simulator 31 operates. The servo/mechanical simulator 31 simulates operations from respective shaft instructions to the mechanical operation. The operation path of the industrial machinery, which is obtained as the result is stored once every sampling time Ts that is determined in advance. This completes the operation storing mode.

In the operation confirming mode, the changeover switch SW1 is set to B, and the changeover switch SW4 is set to G. And, the method for sequentially delivering the positions, which are stored in the operation result storing portion 12, to the low speed instruction converting portion is completely the same as the method in the third embodiment. As in the third embodiment, a path that is equivalent to an actual job operation can be checked, wherein work efficiency can be increased. Also, since the servo portion and the mechanical portion are not actuated in the operation storing mode, it is safer.

As described above, according to the invention, since a low speed instruction converting portion with a mechanical simulator is provided, such an effect can be brought about, in which an actual operation path becomes almost the same as a path in confirming the operation, and operation confirming work can be made efficient.

INDUSTRIAL APPLICABILITY

The present invention is very effective as an operation confirming method in a case where an actual operation path of the industrial machinery having a plurality of shafts driven by servo motors is confirmed at a low speed, and as a control device suited to embodiments of the above-described method.

What is claimed is:

1. An operation confirming method for industrial machinery, by which the operation path is confirmed by actuating industrial machinery provided with a plurality of shafts driven by a servo motor controlled by a servo controller unit at a lower speed than an actual operation speed, comprising the steps of:

inputting respective shaft operation instruction values $\omega j$ based on said actual operation speed into a simulator, which reproduces a servo control, loop at an actual operation speed in said industrial machinery, and instructing a quantity $\omega sj/P$, which is obtained by dividing an output $\omega sj$ from said simulator by an appointed positive real number P to said servo controller unit N times (however, N is the maximum natural number not exceeding said real number P) as respective shaft operation instruction values.

2. An operation confirming method for industrial machinery, by which the operation path is confirmed by actuating industrial machinery provided with a plurality of shafts driven by a servo motor controlled by a servo controller unit at a lower speed than an actual operation speed, comprising the steps of:

inputting a quantity $\omega j/P$, which is obtained by dividing respective shaft operation instruction values $\omega j$ based on said actual operation speed by an appointed positive real number P, into a simulator, which reproduces a servo control loop at an actual operation speed of said industrial machinery, N times (however, N is the maximum natural number not exceeding said real number P), and instructing an output $\omega sij$ from said simulator into said servo controller unit as respective shaft operation instruction values.

3. The operation confirming method for industrial machinery as set forth in claim 1 or 2, wherein said actual operation speed is smaller than an appointed value, a value of said real number P is determined to be 1.0.

4. The operation confirming method for industrial machinery as set forth in claim 1 or 2, wherein respective shaft instruction values $\omega sj$ from said simulator are smaller than values determined shaft by shaft in advance, a value of said real number P is determined to be 1.0.

5. The operation confirming method for industrial machinery as set forth in claim 1 or 2, wherein, in a case where said respective shaft operation instruction values $\omega j$ are smaller than values determined in advance shaft by shaft, the value of said real number P is determined to be 1.0.

6. An operation confirming method for industrial machinery, by which the operation path is confirmed by actuating industrial machinery provided with a plurality of shafts driven by a servo motor controlled by a servo controller unit at a lower speed than an actual operation speed, comprising the steps of:

storing operation paths of said industrial machinery by actuating the industrial machinery at an actual operation speed, that is, positions of said industrial machinery, which are sampled at respective appointed sampling times, as a row of points consisting of n+1 (however, n is a natural number);

converting said operation paths to a row of points consisting of N·(n+1) by interpolating a zone between respective adjacent points of said row of points by dividing the zone by a natural number N set in advance; and sequentially instructing position instructions of respective shafts corresponding to said row of points of N·(n+1) to said servo controller unit.

7. The operation confirming method for industrial machinery as set forth in claim 6, wherein a status inference observer is connected to a servo controller unit of said industrial machinery, and an operation path is inferred by said status inference observer by actually actuating said industrial machinery at an actual operation speed.

8. The operation confirming method for industrial machinery as set forth in claim 6, further comprising the steps of inputting a current instruction value that is applied to said servomotor;

connecting a mechanical simulator, which requests operations of said industrial machinery, to the servo controller unit of said industrial machinery; and preparing an operation path for said industrial machinery to operate at an actual operation speed by said mechanical simulator.

9. The operation confirming method for industrial machinery as set forth in claim 6, further comprising the steps of inputting a rotation angle instruction of a shaft, which is driven by said servo motor;

connecting a servo mechanical simulator, which requests an operation of said industrial machinery, to the servo controller unit of said industrial machinery; and preparing an operation path for said industrial machinery to operate at an actual operation speed by said servo mechanical simulator.

10. A control device for industrial machinery including an operation instruction data storing portion that stores and reproduces operation programs for industrial machinery including: a plurality of shafts driven by servo motors; a shaft operation instruction preparing portion that prepares operation instructions of respective shafts of said plurality of shafts upon receiving instructions of said operation instruction data storing portion; and a servo controller unit that provides a drive current to said servomotors upon receiving respective shaft operation instructions of said shaft operation instruction preparing portion;

further comprising: between said shaft operation instruction preparing portion and the servo controller unit, a simulator that reproduces a servo control loop at an actual operation speed of said industrial machinery upon receiving said respective shaft operation instructions; and a low speed instruction converting portion that divides an output $\omega sj$ of said simulator by an appointed positive real number P and instructs the same to the servo controller unit N times (however, N is the maximum natural number not exceeding said real number P).

11. A control device for industrial machinery including an operation instruction data storing portion that stores and reproduces operation programs for industrial machinery including: a plurality of shafts driven by servo motors; a shaft operation instruction preparing portion that prepares operation instructions of respective shafts of said plurality of shafts upon receiving instructions of said operation instruction data storing portion; and a servo controller unit that provides a drive current to said servomotors upon receiving respective shaft operation instructions of said shaft operation instruction preparing portion;

further comprising: between said shaft operation instruction preparing portion and the servo controller unit, a low speed instruction converting portion that outputs a value, which is obtained by dividing said respective shaft operation instructions by an appointed positive real number P, N times (however, N is the maximum natural number not exceeding said real number P), and a simulator that reproduces a servo control loop at an actual operation speed of said industrial machinery upon receiving an output of said low speed instruction converting portion.

12. A control device for industrial machinery including an operation instruction data storing portion that stores and reproduces operation programs for industrial machinery including: a plurality of shafts driven by servomotors; a shaft operation instruction preparing portion that prepares operation instructions of respective shafts of said plurality of shafts upon receiving instructions of said operation instruction data storing portion; and a servo controller unit that provides a drive current to said servomotors upon receiving respective shaft operation instructions of said shaft operation instruction preparing portion;

further comprising:

a status inference observer that is connected to said servo controller unit and infers positions of said industrial machinery;

an operation result storing portion that stores the positions of said industrial machinery, which are inferred by said status inference observer, at a fixed cycle, and stores the operation path of said industrial machinery as a row of points consisting of n+1; and a low speed instruction converting portion that converts said operation path to a row of points of N·(n+1) by interpolating a zone between adjacent points of said row of points stored by said operation result storing portion by dividing the zone by a natural number N set in advance and sequentially instructs position instructions of the respective shafts corresponding to said row of points of N·(n+1) to said servo controller unit.

13. A control device for industrial machinery including an operation instruction data storing portion that stores and reproduces operation programs for industrial machinery including: a plurality of shafts driven by servomotors; a shaft operation instruction preparing portion that prepares operation instructions of respective shafts of said plurality of shafts upon receiving instructions of said operation instruction data storing portion; and a servo controller unit that provides a drive current to said servomotors upon receiving respective shaft operation instructions of said shaft operation instruction preparing portion;

further comprising:

a mechanical simulator that is connected to said servo controller unit and requests an operation of said industrial machinery by inputting a current instruction value applied to said servo motor;

an operation result storing portion that stores positions of said industrial machinery, which are inferred by said mechanical simulator, at a fixed cycle, and stores an operation path of said industrial machinery as a row of points of n+1; and a low speed instruction converting portion that converts said operation path to a row of points of N·(n+1) by interpolating a zone between adjacent points of said row of points stored by said operation result storing portion by dividing the zone by a natural number N set in advance and sequentially instructs position instructions of the respective shafts corresponding to said row of points of N·(n+1) to said servo controller unit.

14. A control device for industrial machinery including an operation instruction data storing portion that stores and reproduces operation programs for industrial machinery including: a plurality of shafts driven by servomotors; a shaft operation instruction preparing portion that prepares operation instructions of respective shafts of said plurality of shafts upon receiving instructions of said operation instruction data storing portion; and a servo controller unit that provides a drive current to said servomotors upon receiving respective shaft operation instructions of said shaft operation instruction preparing portion;

further comprising:

a servo mechanical simulator that requests an operation of said industrial machinery by inputting a rotation angle instruction of a shaft driven by said servo motor;

an operation result storing portion that stores positions of said industrial machinery, which are inferred by said servo mechanical simulator, at a fixed cycle, and stores an operation path of said industrial machinery as a row of points of n+1; and a low speed instruction converting portion that converts said operation path to a row of points of N·(n+1) by interpolating a zone between adjacent points of said row of points stored by said operation result storing portion by dividing the zone by a natural number N set in advance, and sequentially instructing position instructions of the respective shafts corresponding to said row of points of N·(n+1) to said servo controller unit.

* * * * *